United States Patent [19]

Hagiwara et al.

[11] 4,401,806

[45] Aug. 30, 1983

[54] PROCESS FOR PRODUCING GRAFT COPOLYMER

[75] Inventors: Hiroshi Hagiwara; Takao Iwasaki, both of Iwaki, Japan

[73] Assignee: Kureha Kagaku Kogyo Kabushiki Kaisha, Tokyo, Japan

[21] Appl. No.: 341,701

[22] Filed: Jan. 22, 1982

[30] Foreign Application Priority Data

Jan. 27, 1981 [JP] Japan .................................. 56-10608
May 15, 1981 [JP] Japan .................................. 56-73090

[51] Int. Cl.$^3$ .............................................. C08J 3/16
[52] U.S. Cl. .................................. 528/498; 523/335; 523/336; 528/497
[58] Field of Search ................ 528/497, 498; 523/335, 523/336

[56] References Cited

U.S. PATENT DOCUMENTS 3,311,601 3/1967 Conley ................................. 528/497
3,634,385 1/1972 Walles ................................. 528/497
3,828,012 8/1974 Arndt .................................. 528/497

*Primary Examiner*—Paul R. Michl
*Attorney, Agent, or Firm*—Wenderoth, Lind & Ponack

[57] ABSTRACT

A powdery graft copolymer is obtained by a process characterized in that a graft copolymer latex obtained by graft-polymerizing hard-polymer-giving monomers to an elastic trunk polymer is mixed, after the coagulation of the latex or in the presence of a coagulant, with an organic liquid which is hardly soluble in water and does not dissolve but can wet the graft copolymer, in such a volume ratio that a dispersion wherein water forms a continuous dispersion medium phase and the volume ratio of the organic liquid to the graft polymer is 0.9 to 7.5 is formed, whereby the coagulated graft copolymer is impregnated with the organic liquid and dispersed in water, and then the dispersed copolymer particles are recovered from the water medium. According to this process, a graft copolymer having excellent powder characteristics such as fluidity and particle size distribution can be obtained by the use of a small quantity of an organic liquid.

12 Claims, No Drawings

PROCESS FOR PRODUCING GRAFT COPOLYMER

BACKGROUND OF THE INVENTION

The present invention relates to a process for producing a graft copolymer having an elastic trunk polymer and having excellent powder characteristics and low fine powder content.

Graft copolymers each having an elastic trunk polymer are normally produced by emulsion polymerization because of their properties. They are normally obtained in powder form by coagulating graft copolymer particles in latex form with acids or salts and dehydrating and drying the coagulated graft copolymers.

Graft copolymer powders generally have indefinite forms and contain fine particles. Therefore, these powders have poor fluidity and tend to cause handling problems such as (a) blocking of powder particles during storage and (b) plugging of transfer lines due to insufficient fluidity. To keep pace with recent efficiency improvement programs such as automated powder metering and larger scale transportation methods, improvement of powder characteristics of graft copolymers particularly in blocking and fluidity is strongly desired.

Various methods for improving powder characteristics of graft copolymers have been proposed. They include (a) a method in which a copolymer latex is directly spray-dried to convert the powder into particles of spherical form, (b) a method in which the conditions for coagulating or salting-out a copolymer latex are controlled and (c) a method in which a copolymer latex is dispersed in a particular solvent to convert the copolymer into spherical particles, which are then coagulated. However, these methods have not been fully satisfactory in that powder characteristics are not improved sufficiently, or improvements are seen but some of the polymer's inherent properties are lost, or the copolymer manufacturing cost (mainly utility cost) increases. Therefore, no satisfactory improvement method has yet been found. For example, in the spray-drying method, thermal stability of the resulting polymer becomes poor and operational cost such as utility cost increases. In a method in which a latex is dispersed in a particular solvent to convert copolymer molecules into spherical particles (Japanese Patent Laid-open Pub. No. 68285/1977), a large quantity of the solvent must be handled, and, because spherical latex particles are coagulated from the outside, the coagulation becomes non-uniform, and fish eyes may be caused during processing of the product.

SUMMARY OF THE INVENTION

A principal object of the present invention is to provide an effective process for producing a graft copolymer having an elastic trunk polymer and having excellent powder characteristics and low fine-particle content.

As a result of our efforts in order to achieve the above object, it has been found that mixing of a copolymer latex with a particular organic solvent after or simultaneously with the coagulation of the latex, while maintaining a dispersion in which water forms a continuous phase, is effective, and, by this mixing, adequately coagulated or agglomerated copolymer particles of particularly excellent powder characteristics and processability can be obtained. The process for producing a graft copolymer according to this invention is based on the above finding. More specifically, in the process for producing a graft copolymer according to the invention, a graft copolymer latex obtained by graft-polymerizing hard-polymer-giving monomers onto an elastic trunk polymer is mixed, after the coagulation of the latex or in the presence of a coagulant, with an organic liquid which is hardly soluble in water and does not dissolve but can wet the graft polymer, in such a volume ratio that it produces a dispersion wherein water forms a continuous dispersion medium phase, and the volume ratio of the organic liquid to the graft copolymer is 0.9 to 7.5, whereby the coagulated graft copolymer is impregnated with the organic liquid and dispersed in the water. Then, the dispersed copolymer particles are recovered from the dispersion system.

In the present invention, it is important that the dispersion system in which water acts as a continuous dispersion medium phase be maintained stably. To achieve this, it is particularly preferred that the total volume of the graft copolymer and the organic liquid be less than 40% of the volume of the total mixture, and the volume of the organic liquid be 1 to 5 times that of the graft copolymer.

DETAILED DESCRIPTION OF THE INVENTION

A graft copolymer used in the present invention is obtained by producing an elastic trunk polymer using a normal emulsion polymerization method and then graft-polymerizing hard-polymer-giving monomers onto the resultant trunk polymer in an emulsion state. In this case, the elastic trunk polymer is used in a quantity of 5 to 80 weight parts, preferably 50 to 80 weight parts, and the hard-polymer-giving monomers are added so that the total weight of the obtained graft copolymer becomes 100 weight parts. Both the trunk polymer and the monomers may be crosslinked or non-crosslinked.

Such graft copolymers can be produced by various processes. For instance, Japanese Patent Laid-open Pub. Nos. 22629/1970, 31462/1971. 18621/1974, 40142/1975 and 3667/1977 describe in detail processes for producing such graft copolymers. However, processes other than these processes may be used for producing graft copolymers usable in the invention. As the elastic trunk polymer, polymers of dienes such as butadiene, isoprene and chloroprene, polymers of alkyl acrylates each having an alkyl group of 4 to 10 carbon atoms such as butyl acrylate and octyl acrylate, and copolymers between the monomers giving the aforementioned polymers and monomers copolymerizable therewith can be used. These monomers include aromatic vinyls such as styrene and α-methylstyrene, alkyl methacrylates such as methyl methacrylate and ethyl methacrylate, alkyl acrylates each having an alkyl group of 1 to 3 carbon atoms such as methyl acrylate and ethyl acrylate, and vinyl cyanides such as acrylonitrile and methacrylonitrile.

In the present specification, the term "hard-polymer" refers to those polymers which have a glass transition point above 50° C. in contrast with those polymers having a glass transition point below −10° C. and are usable as elastic trunk polymers in the present invention.

Examples of the hard-polymer-giving monomers are aromatic vinyls such as styrene and α-methylstyrene, alkyl methacrylates such as ethyl methacrylate and butylmethacrylate, vinyl cyanides such as acrylonitrile and methacrylonitrile, and vinyl halides such as vinyl chloride and vinyl bromide. These monomers are used along or in combinations of two or more monomers.

The graft copolymers thus produced and generally known in the art include MBS resin (methyl methacrylate-butadiene-styrene resin), ABS resin (acrylonitrile-butadiene-styrene resin), ABSM resin (acrylonitrile-butadiene-styrene-methyl methacrylate resin) AMS resin (alkyl acrylate-methyl methacrylate-styrene resin and AAS resin (alkyl acrylate-acrylonitrile-styrene resin).

The graft copolymer latex thus obtained is used as it is or, if necessary, after dilution with water in the subsequent steps in a copolymer concentration of about 10 to 50% by weight.

In accordance with the present invention, the graft copolymer latex is mixed, after its coagulation or in the presence of a coagulant, with a specific organic liquid.

For this purpose, those organic liquids which are hardly soluble or substantially insoluble in water and do not dissolve the graft copolymer but can wet it, are used. Preferably, the organic liquid has a surface tension lower than the critical surface tension of the copolymer, namely a surface tension at room temperature of 35 dyne/cm or smaller.

While the kind of the organic liquid to be used differs depending on the kind of the graft copolymer used, paraffinic solvents such as pentane, hexane and heptane, alicyclic hydrocarbons such as cyclopentane, cyclohexane, methylcyclopentane and methylcyclohexane, and alkyl-substituted derivatives of these hydrocarbons are generally used. These organic liquids are used alone or in appropriate combinations.

In a principal mode of mixing of the copolymer latex and the organic liquid according to this invention, the copolymer latex is mixed with the organic liquid after the coagulation of the latex (Mode (1)). The coagulation of the copolymer latex is carried out by any of known methods such as a coagulation method using an acid or a salt as a coagulant, a coagulation method using a water-soluble solvent like emthanol or ethanol, a mechanical coagulation method employing vigorous stirring, or a coagulation method utilizing refrigeration. A preferred method is that in which the copolymer latex is stirred after addition of an inorganic or organic acid such as hydrochloric acid, sulfuric acid, acetic acid, or tartaric acid, or a salt such as sodium chloride, calcium chloride, aluminum sulfate, or Galauber's salt.

In this coagulation stage, the copolymer latex is converted into a slurry containing polymer particles preferably of about one to several tens of microns.

Next, to this slurry is added the organic liquid, and the mixture is stirred. By this mixing, the fine copolymer particles in the slurry are wetted by the organic liquid; the particles impregnated with the organic liquid are agglomerated with each other; and the agglomerated particles take almost spherical forms by the action of surface tension between the organic liquid and water and are dispersed in the water.

In other modes of the present invention, the graft copolymer latex is mixed with the organic liquid in the presence of a coagulant as follows.

(2) The latex is added to and mixed with a mixture of the organic liquid and an aqueous solution of a coagulant.

(3) A mixture of the organic liquid and the latex is added to and mixed with an aqueous solution of a coagulant.

(4) The organic liquid and the latex are simultaneously added to and mixed with an aqueous solution of a coagulant.

(5) An aqueous solution of a coagulant is added to and mixed with a mixture of the organic liquid and the latex.

(6) The latex, the organic liquid and an aqueous solution of a coagulant are charged into a mixing vessel simultaneously and continuously and mixed. At this time, by continuously withdrawing the resulting dispersion liquid, the coagulation and mixing can be carried out simultaneously and continuously.

In the above modes (2) to (6), the latex is subjected to coagulation in the presence of the organic liquid dispersed in water; the coagulated or agglomerated copolymer particles are impregnated with the organic liquid; and these particles impregnated with the organic liquid finally take spherical forms by the action of surface tension between the organic liquid and water and are dispersed in the water.

Among the above modes (1) through (6), the modes (1) and (6) are most preferably adopted from the standpoints of product quality and reasonable process operation.

In any mode, it is necessary that the dispersion system comprising water as a continuous dispersion medium phase be maintained stably. It is also necessary that the organic liquid be used in a quantity which is sufficient to impregnate the graft copolymer particles and contribute to their agglomeration and ensphering. From this need, it is necessary that the volume ratio of the organic liquid to the copolymer be within the range of 0.9 to 7.5 (approximately corresponding to a weight ratio of from 0.6 to 5.0). In order to obtain an adequate balance between the stability of the dispersion system and the modification effect of the organic liquid, the above ratio is preferably 1 to 5 and most preferably 1 to 3. In order to obtain a stable disperse system, it is desirable that the volume sum of the organic liquid and the graft copolymer be less than 40% of the total volume of the total mixture namely the organic liquid, the graft copolymer, water and the coagulant. When the volume sum of the organic liquid and the copolymer is 40% or more of the total volume of the total mixture and the volume ratio of the organic liquid to the graft copolymer is over 5, dispersion of the copolymer particles impregnated with the organic liquid in water becomes difficult, and, rather, the latex is dispersed in the organic liquid, whereby it becomes impossible to achieve the objects of this invention. The above volumetric ratio requirement is essential especially when, as in the above modes (2) through (6), the coagulation of the latex and addition of the organic liquid are carried out simultaneously.

Incidentally, in calculating the above volumetric ratio, it is sufficient to use and add up the volumes of the respective components obtained by dividing the weights of the components by their densities at room temperature, and the real volumes of the mixture need not be used.

The process of the invention is advantageous because the quantity of the organic liquid is small. Also, because the coagulation of the copolymer latex is not carried out in a system wherein the latex is dispersed in the organic liquid, the coagulation occurs uniformly, and therefore fish eyes seldom appear during processing of the product copolymer.

When the copolymer latex is mixed with the organic liquid after the coagulation or in the presence of a coagulant, appropriate stirring or shaking is necessary in order to obtain uniform spherical particles. In order to promote the dispersion of the organic liquid or the copolymer impregnated with the organic liquid in water, known surfactants such as alkylbenzenesulfonates, salts of higher fatty acids, salts of alkylsuccinic acids and sorbitan higher fatty acid esters can be added in a proportion of 0.01 to 0.5% by weight based on the copolymer. Furthermore, in order to prevent the copolymer particles converted to spherical forms by the presence of the organic liquid from agglomerating to form larger lumps, suspension aids such as methyl cellulose and partially saponified polyvinyl alcohols can be added in a quantity of 0.005 to 0.5% by weight based on the copolymer.

From the slurry containing the above almost spherical copolymer particles, the organic liquid is removed, and the copolymer particles obtained are separated from the water, washed with water, and dried by a conventional method. The removal of the organic liquid is conducted by heating the slurry to a temperature around the boiling point of the organic liquid under atmospheric pressure, or by keeping the slurry at a temperature corresponding to the boiling point under reduced pressure or under pressure. Removal at 40° to 100° C., is desirable because the heating strengthens the bonding of the agglomerated copolymer particles and makes the apparent density of the copolymer higher.

The copolymer particles of the present invention are of spherical form due to appropriate agglomeration of fine particles, and this spherical form is not destroyed in subsequent steps of draining, washing with water, and drying. Accordingly almost no fine powder is formed, the copolymer particles having excellent fluidity, and a larger bulk density being easily obtained. For this reason, troubles such as blocking during storage and plugging of transportation lines can be considerably reduced, and simplification of storage facilities as well as large-scale operation of storage and transportation become possible. Because the copolymer particles have a uniform shape and the content of fine powder is low, draining from the slurry is facilitated, and the water content in the wet cake obtained from draining processes such as centrifugation and suction filtration is about 20 to 50% lower than that of conventional wet cakes, whereby drying can be done with a much lower load. Further, because the fine powder content is low, the possibility of explosion due to dust is extremely low even in such situations where the copolymer is likely to burn.

The agglomerated copolymer of this invention is a product formed by appropriate agglomeration of the fine copolymer particles in the original latex. Therefore, the agglomerated copolymer can be easily returned to the original particles in the latex by kneading during processing. Therefore, even when the graft copolymer of this invention is added to hard resins such as vinyl chloride resins and polymethylmethacrylate resins as an impact resistance modifier in a proportion of, for example, 1% to 20% by weight based on the total polymer, the effect of its addition is not impaired during processing. This is another important advantage of this invention.

The nature and utility of the present invention will now be indicated more fully by the following specific examples. In these examples, quantities expressed in "%" and "parts" are by weight unless otherwise specified. Methods for measurement and standards of evaluation of powder characteristics used in the examples are shown in Table 1 summarized in advance.

TABLE 1

| Evaluation item | Evaluation method and standard |
|---|---|
| Fluidity | In a tester for measuring bulk density specified in Japan Industrial Standards designation JIS K-6721 was placed 50 g of a resin powder. The dumper was removed and the state of the flow of the powder was observed, and the flow speed was measured in terms of the time in which all of the powder flowed out (sec./50 g). Ranking of flow state: <br> O When the dumper is removed, the powder begins flowing by itself and keeps flowing. <br> Δ When an impact is applied the powder begins flowing and keeps flowing. <br> X With application of continuous impacts, the powder begins flowing. <br> XX Even with application of continuous impacts, the powder does not flow. <br> Flow speed was measured with respect to powders whose flow states were O and Δ. |
| Bulk density | Measured in accordance with JIS K-6721 (g/ml). The sample quantity was 50 g. |
| Izod impact strength | Measured in accordance with JIS K-7110. (kg.cm/cm) |

EXAMPLE 1

Seventy parts of a crosslinked trunk polymer comprising 1.5% of divinylbenzene, 76% of butadiene and 22.5% of styrene were obtained by emulsion-polymerization. Successively, in the presence of the trunk polymer, were graft-polymerized in an emulsion state 14 parts of styrene, 8.5 parts of methylmethacrylate and 0.3 part of divinylbenzene, and, further, 7.5 parts of methylmethacrylate and 0.15 part of divinylbenzene were polymerized. The polymerization yields in each stage were almost 100%, and the solid content in this graft copolymer latex was 35% with a specific gravity of about 1.0.

In a glass container of an inner diameter of about 12 cm and of a capacity of 2 liters was placed 800 cc of an aqueous sulfuric acid solution of a pH of about 2. With stirring at 1,200 rpm by the use of a two-level stirrer, 200 g of the above copolymer latex was then charged to prepare in which the copolymer formed fine particles. Next, 0.07 of methyl cellulose and 0.07 g of polyoxyethylene sorbitan monolaurate dissolved in 100 cc of water were added to the slurry. After thorough mixing, n-hexane (specific gravity 0.66, surface tension 18.4 dyne/cm at 20° C.) was added in a volume of 137 cc (which corresponds to about 130 parts for 100 parts of the copolymer). In 2 to 3 minutes the viscosity of the reaction system increased sharply and the fine particles became secondarily-agglomerated, almost spherical particles of an average diameter of 150 to 200μ. These secondarily-agglomerated particles retained respective spherical forms even after termination of stirring. Next, a system comprising a slurry of the spherical particles was heated to 70° C. to remove n-hexane, and, after draining and drying, copolymer particles were obtained.

The properties of these copolymer particles were measured in accordance with the methods of Table 1. The results of the measurement are shown in Table 2.

A compound was prepared by mixing 12.5 parts of the above graft copolymer with 87.5 parts of a polyvinyl chloride of a degree of polymerization of 700 and containing two parts of a tin stabilizer and 1 part of a TABLE 2-continued

|  | Example | | | | | | Comparison Example | | Example |
| --- | --- | --- | --- | --- | --- | --- | --- | --- | --- |
|  | 1 | 2 | 3 | 4 | 5 | 6 | 1 | 2 | 7 |
| Volume ratio | | | | | | | | | |
| Organic liquid / Graft copolymer | 1.96 | 0.91 | 3.02 | 4.54 | 1.91 | 1.67 | — | 0.75 | 1.96 |
| (Copolymer + Organic liquid) / Total mixture (%) | 14.6 | 11.5 | 21.4 | 27.3 | 16.5 | 15.4 | — |  | 14.6 |

EXAMPLE 8

In a glass container of an inner diameter of about 12 cm and of a capacity of 2 liters were placed 570 ml of aqueous hydrochloric acid solution of a pH of about 2. To this container was added 0.07 g of polyoxyethylene sorbitan monostearate dissolved in 30 ml of water. Then, 140 ml of n-hexane (specific gravity 0.66, surface tension 18.4 dyne/cm at 20° C.) was added and dispersed with ample stirring. Two hundred milliliters of the latex of Example 1 was added. In 1 to 3 minutes the viscosity of the system increased sharply, and with the subsequent reduction of the viscosity, particles of almost spherical shape of an average diameter of 150 to 200μ were formed. Even after termination of stirring, these particles retained their spherical form.

In this case, the sum of the n-hexane volume and the graft copolymer volume was 22.3% of the total mixture volume, and the n-hexane volume was 2 times the graft copolymer volume.

Next, the slurry of the spherical particles was heated to 65° C. to remove the n-hexane, and after draining and drying, copolymer particles were obtained.

These copolymer particles were evaluated similarly as in Example 1. The results are shown in Table 3 together with related data.

EXAMPLES 9, 10 AND 11

By using the graft copolymer latex of Example 8 and employing the procedure of Example 8 except that n-hexane was used in volumes of 100, 200 and 300 ml, respectively, three samples of agglomerated graft copolymer particles were obtained.

The results of their evaluation are shown in Table 3.

EXAMPLES 12 AND 13

By using the graft copolymer latex of Example 8 and employing the procedure of Example 8 except that n-heptane and cyclohexane were used respectively in place of n-hexane, two samples of graft copolymer particles were obtained.

The results of their evaluations were as shown in Table 3.

COMPARISION EXAMPLE 4

To 600 ml of an aqueous hydrochloric acid solution of a pH of about 2 was added with stirring the latex of Example 8 similarly as in Example 8, and the slurry formed was heated to about 90° C. After successive draining, filtration and drying, copolymer particles were obtained.

The results of their evaluations are shown in Table 3.

COMPARISION EXAMPLE 5

The graft copolymer latex of Example 1 was used and the procedure of Example 1 was employed except that 500 ml of n-hexane was used. When the copolymer latex was added, the whole mixture solidified into lumps, and granular particles could not be obtained. The total volume of n-hexane and the copolymer was 43.8% of the volume of the whole mixture, and the volume of n-hexane was 7.14 times that of the copolymer.

COMPARISION EXAMPLE 6

The apparatus and the graft copolymer latex of Example 8 were used, and as an organic liquid carbon tetrachloride which can dissolve this graft copolymer was used in place of n-hexane. As soon as the graft copolymer was added, partial dissolution of this copolymer occurred and the agglomerated particles became coarse particles of irregular shapes of 3- to 10-mm sizes. Therefore, improvement in powder characteristics could not be achieved.

EXAMPLE 14

In the apparatus used in Example 8 was placed 600 ml of an aqueous hydrochloric acid solution of a pH of about 2. In this solution was dissolved 0.07 g of polyoxyethylene sorbitan monostearate, and then a mixture of 140 ml of n-hexane and 200 ml of the graft copolymer latex used in Example 8 was added with stirring at 1,200 rpm. In 1 to 3 minutes the viscosity of the system increased sharply. In the subsequent 1 to 2 minutes the viscosity decreased and almost spherical, agglomerated particles of an average diameter of 150 to 200μ were obtained. Even after termination of stirring, these particles retained their spherical form. Next, the slurry of these spherical particles was heated to 65° C. to remove the n-hexane, and after draining and drying, copolymer particles were obtained. Their powder characteristics and Izod impact strength are shown in Table 3.

EXAMPLE 15

A graft copolymer latex was obtained by (1) producing by emulsion polymerization 65 parts of a copolymer comprising 53.8% of octyl acrylate, 30.7% of butadiene and 15.5% of methyl methacrylate, (2) successively graft-polymerizing in the system 11 parts of styrene, 5 parts of methyl methacrylate and 4 parts of acrylonitrile and (3) further polymerizing 15 parts of methyl methacrylate in an emulsion state. The resulting latex had a solid content of 30% by weight. Using the apparatus and the procedure of Example 8, granulation was conducted from the latex with addition of 140 ml of n-hexane. The results of evaluation of the copolymer particles obtained are shown in Table 3.

EXAMPLE 16

Into the bottom of a granulation tower with a hollow cylindrical shape of an inner diameter of 50 mm and a height of 1,400 mm, equipped with a paddle agitator having a paddle diameter of 45 mm, were charged simultaneously, with stirring at 2,100 rpm, (a) the copolymeer latex used in Example 8 at a rate of 120 cc/min., (b) an aqueous hydrochloric acid solution of a pH of 2.4 at 360 cc/min., (c) a 0.21% aqueous solution of polyoxyethylene sorbitan monostearate at 20 cc/min, and (d) n-hexane at 80 cc/min. When steady flow conditions were established in the tower, copolymer particles in the slurry flowing out of the tower top were uniformly enlarged in size and made spherical in shape.

This slurry was heated to 70° C. to remove the n-hexane and, after draining and drying, copolymer particles were obtained. The results of their evaluation are shown in Table 3. A remarkable improvement in powder characteristics is seen. With respect to Izod impact strength, there is no significant difference compared with other examples and comparison examples.

TABLE 3

|  | Example |  |  |  |  |  | Comparison Example | Example |  |  |
|---|---|---|---|---|---|---|---|---|---|---|
|  | 8 | 9 | 10 | 11 | 12 | 13 | 4 | 14 | 15 | 16 |
| Organic liquid |  |  |  |  |  |  |  |  |  |  |
| Kind | n-Hexane | n-Hexane | n-Hexane | n-Hexane | n-Heptane | Cyclohexane | (not used) | n-Hexane | n-Hexane | n-Hexane |
| Volume used (ml) | 140 | 100 | 200 | 300 | 140 | 200 | — | 140 | 140 | 80 ml/min |
| Organic liquid + Copolymer Total mixture (Volume %) | 22.3 | 18.9 | 27.0 | 33.6 | 22.3 | 27.0 | — | 22.3 | 21.3 | 21.0 |
| Organic liquid / Copolymer (Volume ratio) | 2.00 | 1.43 | 2.86 | 4.28 | 2.00 | 2.86 | — | 2.00 | 2.33 | 1.90 |
| Powder characteristics |  |  |  |  |  |  |  |  |  |  |
| Fluidity |  |  |  |  |  |  |  |  |  |  |
| Flow state | O | O | O | Δ | O | Δ | XX | O | O | O |
| Flow speed (sec/50g) | 14.8 | 24.6 | 16.6 | 18.2 | 15.2 | 23.2 | No flow | 13.7 | 14.3 | 15.0 |
| Particle size distribution |  |  |  |  |  |  |  |  |  |  |
| 297 or larger (μ) | 1.3 | 0 | 38.3 | 43.6 | 0.8 | 0 | 12.3 | 0.2 | 0.4 | 1.0 |
| 297 to 149 (μ) | 64.9 | 23.7 | 38.6 | 38.7 | 55.8 | 29.3 | 23.2 | 68.5 | 46.6 | 57.4 |
| 149 to 105 (μ) | 26.4 | 43.3 | 22.3 | 16.9 | 32.1 | 39.4 | 16.8 | 18.6 | 33.0 | 22.6 |
| 105 to 44 (μ) | 7.2 | 23.2 | 0.7 | 0.6 | 11.1 | 29.3 | 20.7 | 11.4 | 18.9 | 18.7 |
| 44 or smaller (μ) | 0.2 | 9.8 | 0.1 | 0.2 | 0.2 | 2.0 | 27.0 | 1.3 | 1.1 | 0.8 |
| Bulk density (g/ml) | 0.401 | 0.355 | 0.382 | 0.388 | 0.393 | 0.345 | 0.288 | 0.383 | 0.387 | 0.440 |
| Izod impact strength (kg·cm/cm) | 108 | 109 | 107 | 112 | 106 | 110 | 109 | 107 | 112 | 109 |

What is claimed is:

1. A process for producing a graft copolymer, which comprises mixing a graft copolymer latex obtained by graft-polymerizing hard-polymer-giving monomers onto an elastic trunk polymer with an organic liquid, either after the coagulation of the latex or in the presence of a coagulant, said organic liquid being substantially insoluble in water and does not dissolve but can wet the graft copolymer, said mixture being effected in the presence of water to form dispersion wherein water forms a continuous dispersion medium phase and wherein the volume ratio of the organic liquid to the graft copolymer is 0.9 to 7.5 and the total volume of the graft copolymer and the organic liquid is less than 40% of the volume of the dispersion, whereby the coagulated graft copolymer is impregnated with the organic liquid and dispersed in water, and subsequently recovering the dispersed copolymer particles from the dispersion.

2. A process for producing a graft copolymer according to claim 1, wherein the volume ratio of the orlganic liquid to the graft copolymer is from 1 to 5.

3. A process for producing a graft copolymer according to claim 1 or 2, wherein the latex is mixed, after its coagulation, with the organic liquid.

4. A process of producing a graft copolymer according to claim 1 or 2, wherein the latex is added to and mixed with a mixture of an aqueous solution of a coagulant and the organic liquid.

5. A process for producing a graft copolymer according to claim 1 or 2, wherein a mixture of the organic liquid and the latex is added to and mixed with an aqueous solution of a coagulant.

6. A process for producing a graft copolymer according to claim 1 or 2, wherein the organic liquid and the latex are simultaneously added to and mixed with an aqueous solution of a coagulant.

7. A process for producing a graft copolymer according to claim 1 or 2, wherein an aqueous solution of a coagulant is added to and mixed with a mixture of the organic liquid and the latex.

8. A process for producing a graft copolymer according to claim 1 or 2, wherein the latex, the organic liquid and an aqueous solution of a coagulant are simultaneously and continuously charged into a mixing vessel and are mixed with each other.

9. A process for producing a graft copolymer according to claim 8, wherein the dispersion liquid obtained is continuously withdrawn in order to carry out coagulation and mixing simultaneously and continuousy.

10. A process for producing a graft copolymer according to claim 1, wherein the surface tension of the organic liquid is 35 dyne/cm or lower at room temperature.

11. A process for producing a graft copolymer according to claim 1, wherein the organic liquid impregnating the graft copolymer particles is removed prior to the recovery of the copolymer particles from the dispersion.

12. A process for producing a graft copolymer according to claim 11, wherein the removal of the organic liquid is carried out by heating the dispersion to 40° to 100° C.

* * * * *